US011883933B1

(12) United States Patent
Goldheart et al.

(10) Patent No.: US 11,883,933 B1
(45) Date of Patent: Jan. 30, 2024

(54) SCREW-DRIVEN SPREADING TOOL WITH A DISENGAGE

(71) Applicant: IFIXIT, San Luis Obispo, CA (US)

(72) Inventors: Andrew Goldheart, Los Osos, CA (US); Brett Hartt, Carson City, NV (US); Ladeanne Graycochea, San Leandro, CA (US)

(73) Assignee: IFIXIT, San Luis Obispo, CA (US)

( * ) Notice: Subject to any disclaimer, the term of this patent is extended or adjusted under 35 U.S.C. 154(b) by 0 days.

(21) Appl. No.: 17/894,508

(22) Filed: Aug. 24, 2022

(51) Int. Cl.
*B25B 27/02* (2006.01)

(52) U.S. Cl.
CPC .................................. *B25B 27/023* (2013.01)

(58) Field of Classification Search
CPC ......... B25B 27/023; B25B 5/10; B25B 5/101; B25B 5/103
USPC ............... 29/256; 269/43, 228, 45, 246, 148
See application file for complete search history.

(56) References Cited

U.S. PATENT DOCUMENTS 1,749,491 A * 3/1930 Kokay .................... B25B 5/101 269/215
2,671,482 A * 3/1954 Gordon ..................... B25B 5/10 269/182
3,149,390 A 9/1964 McCoy
3,736,629 A 6/1973 Blake
3,770,259 A 11/1973 Wagreich
4,455,706 A 6/1984 Volkmann et al.
4,619,447 A 10/1986 Blake
5,101,679 A 4/1992 Smith et al.
5,569,274 A 10/1996 Rapacki et al.
5,634,932 A 6/1997 Schmidt
5,820,116 A 10/1998 Haese
6,015,145 A 1/2000 Hartel
6,374,465 B1 4/2002 Dykstra
6,478,919 B1 11/2002 Kawada et al.
6,799,756 B2 10/2004 Degen
6,893,012 B2 * 5/2005 Wong ...................... B25B 5/103 269/239
7,007,942 B1 3/2006 Stearns et al.
7,854,186 B2 12/2010 Wu
8,595,891 B2 12/2013 Okamoto et al.
8,794,612 B2 8/2014 Chuang
(Continued)

OTHER PUBLICATIONS https://eustore.ifixit.com/products/isclack-evo; iFixIt, iSclack Evo; Last accessed on Aug. 24, 2022.
(Continued)

*Primary Examiner* — Don M Anderson
*Assistant Examiner* — Jason Khalil Hawkins
(74) *Attorney, Agent, or Firm* — Akerman LLP; Brice S. Dumais

(57) ABSTRACT

According to one example, a tool includes a second arm pivotally coupled to a first arm, a lead screw nut pivotally coupled to a second portion of the second arm, and a lead screw extending through an opening of the lead screw nut, the lead screw being pivotally and rotationally coupled to a second portion of the first arm. The tool has an engaged configuration and a disengaged configuration. In the engaged configuration, a first portion of the first arm may be pivoted further from a first portion of the second arm when the lead screw is rotated. In the disengaged configuration, the first portion of the first arm may be pivoted closer to the first portion of the second arm without the lead screw being rotated.

20 Claims, 3 Drawing Sheets

(56) References Cited

U.S. PATENT DOCUMENTS

| | | | |
|---|---|---|---|
| 9,206,943 | B2 | 12/2015 | Chang |
| 9,381,648 | B1 | 7/2016 | Liu |
| 9,737,976 | B2 | 8/2017 | Christensen |
| 10,307,893 | B2 | 6/2019 | Costen |
| 10,479,619 | B2 | 11/2019 | Mochizuki |
| 10,493,637 | B2 | 12/2019 | Taira et al. |
| 10,927,277 | B2 | 2/2021 | Krull et al. |
| 10,952,743 | B2 | 3/2021 | Adams et al. |
| 11,148,912 | B2 | 10/2021 | Nguyen |
| 2006/0231705 | A1 | 10/2006 | Liu |
| 2007/0151667 | A1 | 7/2007 | Tani et al. |
| 2014/0238617 | A1 | 8/2014 | Shair et al. |
| 2015/0008631 | A1 | 1/2015 | Liu |

OTHER PUBLICATIONS https://multi-com.eu/,details,id_pr,16545,key,gtool-screen-jack-pro-sj-01-for-iphone-5-5s-5c-6-6plus.html; Gtool Screen Jack Pro SJ-01 for iPhone 5, 5S, 5C, 6, 6Plus; Lase accessed on Aug. 19, 2022.

https://www.ifixit.com/store/tools/gtool-screen-jack/if145-281?o=1; iFixIt, gTool Screen Jack; Last accessed on Aug. 19, 2022.

https://www.harborfreight.com/6-inch-quick-release-c-clamp-4140.html; Harbor Freight, Pittsburgh 6 in. Quick-Release C-Clamp; Last accessed on Aug. 19, 2022.

https://www.google.com/search?q=lathe+half+nut&sxsrf=aliczsbh0jnzsa00m7y5umms3-k8fgp3fg:1658953957956&source=lnms&tbm=isch&sa=x&ved=2ahukewj06fkk9zn5ahuybdqihrurcmsq_auoanoecaeqba&biw=2560&bih=1240&dpr=1.5; Google search for lathe half nut; Last accessed on Aug. 19, 2022.

https://www.jwwinco.com/en-us/products/2.2-tensioning-clamping-with-handles/quick-release-knobs/gn-6303.1-steel-quick-release-knurled-nuts-steel; JW Winco GN 6303.1 Quick Release Knurled Nuts; Last accessed on Aug. 19, 2022.

U.S. Pat. No. 996,244; Hess, Jun. 27, 1911.

https://www.injuredgadgets.com/tbk-202-right-side-open-screen-separator-split-screen-tool-for-iphone-x-to-11-series/; TBK—202 Right Side Open Screen Separator / Split Screen Tool for IPhone X To 11 Series; Last accessed on Nov. 14, 2022.

* cited by examiner

SCREW-DRIVEN SPREADING TOOL WITH A DISENGAGE

TECHNICAL FIELD

This disclosure relates generally to the field of tools and more specifically to a screw-driven spreading tool with a disengage.

BACKGROUND

More and more consumer devices (e.g., mobile phones) utilize a strong adhesive or glue to hold the closure components (e.g., the opposing panels of a mobile phone) together. It can be very difficult to access the internal components of these devices for repair without causing damage to the device or risking the safety of the operator. Traditionally, a tool may be used to separate portions of these devices (e.g., separate the front and back panels of a mobile phone). These traditional tools, however, may be deficient.

SUMMARY

According to one example, a tool includes a first arm, a second arm, a lead screw nut, a lead screw block, and a lead screw. The first arm has a first portion and a second portion, and the second arm has a first portion and a second portion. The second arm is pivotally coupled to the first arm. The lead screw nut is pivotally coupled to the second portion of the second arm, and has an opening that extends through the lead screw nut. The opening has a first opening portion and a second opening portion. The second opening portion has a plurality of threads. The lead screw block is pivotally coupled to the second portion of the first arm, and has an opening that extends through the lead screw block. The lead screw extends through the opening of the lead screw nut and through the opening of the lead screw block. The lead screw has a first screw portion that has a plurality of threads, and that further has a first diameter that is less than a diameter of the first opening portion of the opening of the lead screw nut. The lead screw further has a second screw portion that has a second diameter that is greater than the diameter of the opening of the lead screw block. The tool has an engaged configuration and a disengaged configuration. In the engaged configuration, the lead screw extends through the opening of the lead screw nut in a position that causes the lead screw to extend through the second opening portion of the opening of the lead screw nut and further causes the plurality of threads of the lead screw to engage with the plurality of the threads of the second opening portion of the opening of the lead screw nut. Also, in the engaged configuration, the tool is configured to cause the first portion of the first arm to pivot closer to the first portion of the second arm when the lead screw is rotated in a first direction, and the tool is further configured to cause the first portion of the first arm to pivot further from the first portion of the second arm when the lead screw is rotated in a second direction. In the disengaged configuration, the lead screw extends through the opening of the lead screw nut in a position that causes the lead screw to extend through the first opening portion of the opening of the lead screw nut. Also, in the disengaged configuration, the tool is configured to allow the first portion of the first arm to be pivoted closer to the first portion of the second arm without the lead screw being rotated, and the tool is further configured to allow the first portion of the first arm to be pivoted further from the first portion of the second arm without the lead screw being rotated.

The lead screw may be pivotable, in relation to the first and second arms, by a user to switch the tool from the engaged configuration to the disengaged configuration and from the disengaged configuration to the engaged configuration. The tool may be configured to be switched from the engaged configuration to the disengaged configuration and from the disengaged configuration to the engaged configuration without the use of any springs and/or without the use of any buttons.

The tool may further include a first attachment point pivotally coupled to the first portion of the first arm, and a second attachment point pivotally coupled to the first portion of the second arm. The first attachment point may include a first suction cup, and the second attachment point may include a second suction cup.

According to a second example, a tool includes a lead screw and both an engagement and disengagement configuration. The disengagement configuration allows the arms of the tool to move unconstrained, so as to allow the user to open and close the arms at will. The engagement configuration re-engages the lead screw, which may allow the user to apply the exact amount of separating force required by turning the lead screw only as much as is needed to generate the separating force. This separating force may then remain in place due to the self-locking nature of the lead screw. In some examples, the tool may allow users to gain access to the internal components of glued-shut devices (e.g., mobile phones) by allowing the user to apply a constant, infinitely adjustable, opening force, hands-free. In some examples, the tool may also allow for simple application of the tool to a device (e.g., mobile phones) via one or more opposed attachment points (e.g., suction cups, wedges, inserting claws) which may allow for good contact to the device and force application to the device (e.g., to separate the panels of the mobile phone).

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Figure 1A:
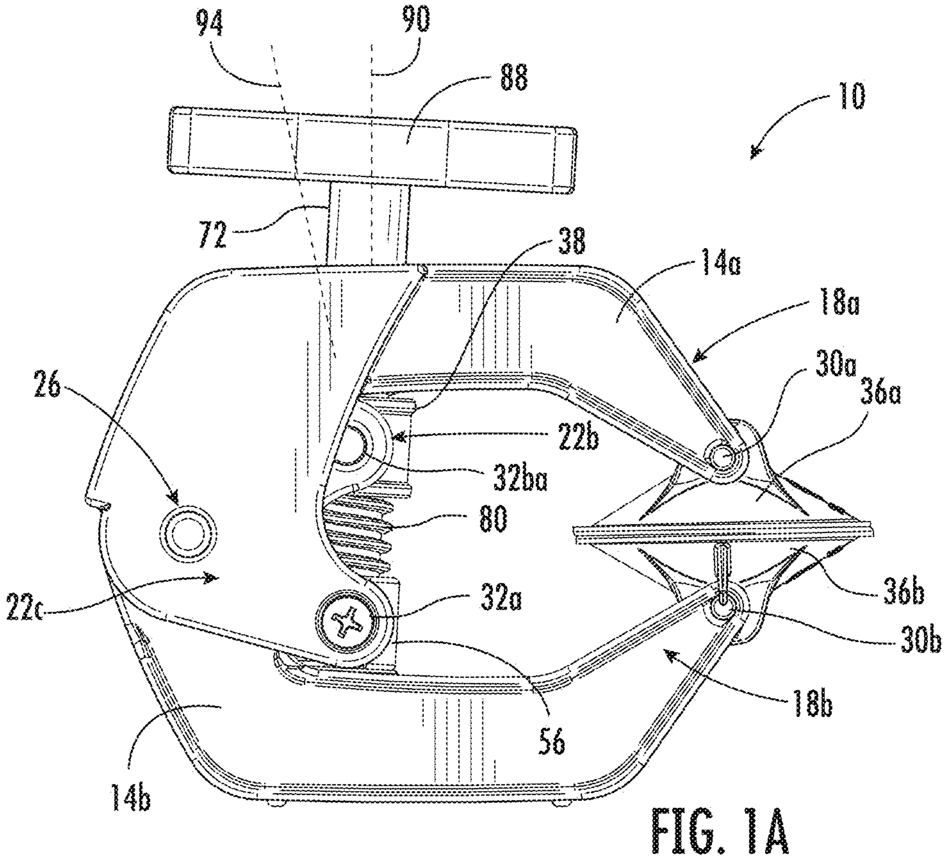
FIG. 1A is a side view of one example of screw-driven spreading tool with a disengage.

Embodiments of the present disclosure are best understood by referring to FIGS. 1A-3 of the drawings, like numerals being used for like and corresponding parts of the various drawings.

More and more consumer devices (e.g., mobile phones) utilize a strong adhesive or glue to hold the closure components (e.g., the opposing panels of a mobile phone) together. It can be very difficult to access the internal components of these devices for repair without causing damage to the device or risking the safety of the operator. Traditionally, a tool may be used to separate portions of these devices (e.g., separate the front and back panels of a mobile phone). These traditional tools, however, may be deficient. For example, many traditional tools require a user to constantly apply pressure to the tool in order to keep the portions of the device separated, which may prevent the user from being to let go of the tool. As another example, traditional tools that can apply a constant force may not able to disengage this force application, which can be cumbersome and inefficient, as it may require the user to screw the tool closed all the way down to the device (in order to connect with the device).

In contrast to these traditional tools, the tool 10 of FIGS. 1A-3 may address one or more of these deficiencies. For example, the tool 10 may have both an engagement configuration and a disengagement configuration. In the disengagement configuration, the user may be able to move (e.g., pivot) the arms 14 of the tool 10 unconstrained, which may allow the user to easily apply the attachment points 36 (e.g., suction cups) to the device that is being worked on (e.g., a mobile phone), in some examples. The user can then switch the tool 10 to the engagement configuration, which may engage threads 80 of the lead screw 72 with threads 54 of a second opening portion 50 of an opening 42 of a lead screw nut 38. The lead screw 72 may then be rotated (e.g., counter-clockwise) by the user, which may allow the user to apply an exact amount of separating force (e.g., a constant but infinitely adjustable separating force) to the device, in some examples. The separating force may then remain in place due to the self-locking nature of the lead screw 72 (even after the user removes their hands from the tool 10), in some examples. This may allow the user to remove their hands from the tool 10, and then use those hands to work on the components of the device (e.g., a mobile phone), in some examples.

FIGS. 1A-3 illustrate one example of a screw-driven spreading tool 10 with a disengage. In the example illustrated in FIGS. 1A-3, the tool 10 includes arms 14, attachment points 36, a lead screw nut 38, a lead screw block 56, and a lead screw 72.

In the example illustrated in FIGS. 1A-3, the tool 10 includes two arms 14 (e.g., upper arm 14*a* and lower arm 14*b*) that are pivotally coupled to each other. The arm 14 may refer to any structure that may be pivoted (or otherwise moved) in relation to another arm 14 so that a portion of the arm 14 moves closer or further away from a portion of the another arm 14.

In the illustrated example, the arm 14 includes a first portion 18 and second portion 22. The first portion 18 is a portion of the arm 14 that may apply a force to a device (e.g., a mobile phone) when the tool 14 is in use. The second portion 22 is a portion of the arm 14 that may be pivotally coupled to the lead screw nut 38 or the lead screw block 56.

In the illustrated example, the first portion 18*a* of upper arm 14*a* is positioned above (e.g., it is higher) and more forward (e.g., it is longer) than the second portion 22*a* of the upper arm 14*a*, and the first portion 18*b* of the lower arm 14*b* is positioned below (e.g., it is lower) and more forward (e.g., it is longer) than the second portion 22*b* of the lower arm 14*b*, Additionally, in the illustrated example, the lower arm 14*b* is shaped and/or sized so that the second portion 22*b* of the lower arm 14*b* may fit within the second portion 22*a* of the upper arm 14*a*, so that they overlap. The arms 14, however, may have any other shape and/or any other size.

In the illustrated example, the arms 14 further include a pivot axle 26. This pivot axle 26 is the portion at which the arms 14 are pivotally coupled together, and also the portion from which the arms pivot in relation to each other. In operation, the arms 14 may pivot open and closed along this pivot axle 26. When the arms 14 pivot open (e.g., so as to apply a spreading force to a device), the first portions 18*a* and 18*b* of the arms 14*a* and 14*b* may move further away from each other, while the second portions 22*a* and 22*b* of the arms 14*a* and 14*b* may move closer to each other, in some examples. In reverse, when the arms 14 pivot closed (e.g., so as to attach to the device), the first portions 18*a* and 18*b* of the arms 14*a* and 14*b* may move closer to each other, while the second portions 22*a* and 22*b* of the arms 14*a* and 14*b* may move further from each other, in some examples.

Figure 1B:
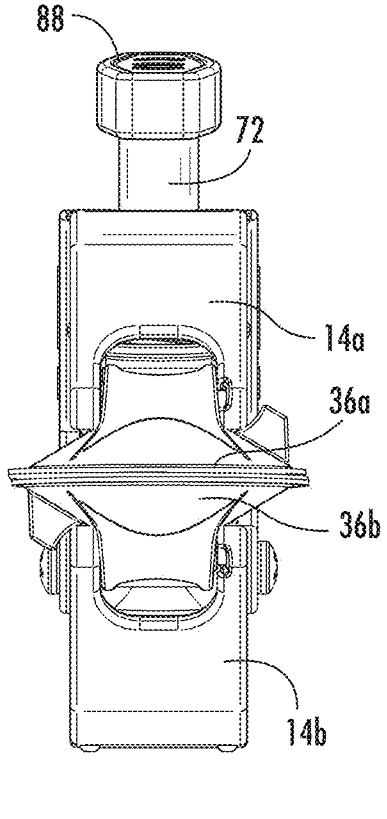
FIG. 1B is a front view of the tool of FIG. 1A.
Figure 1C:
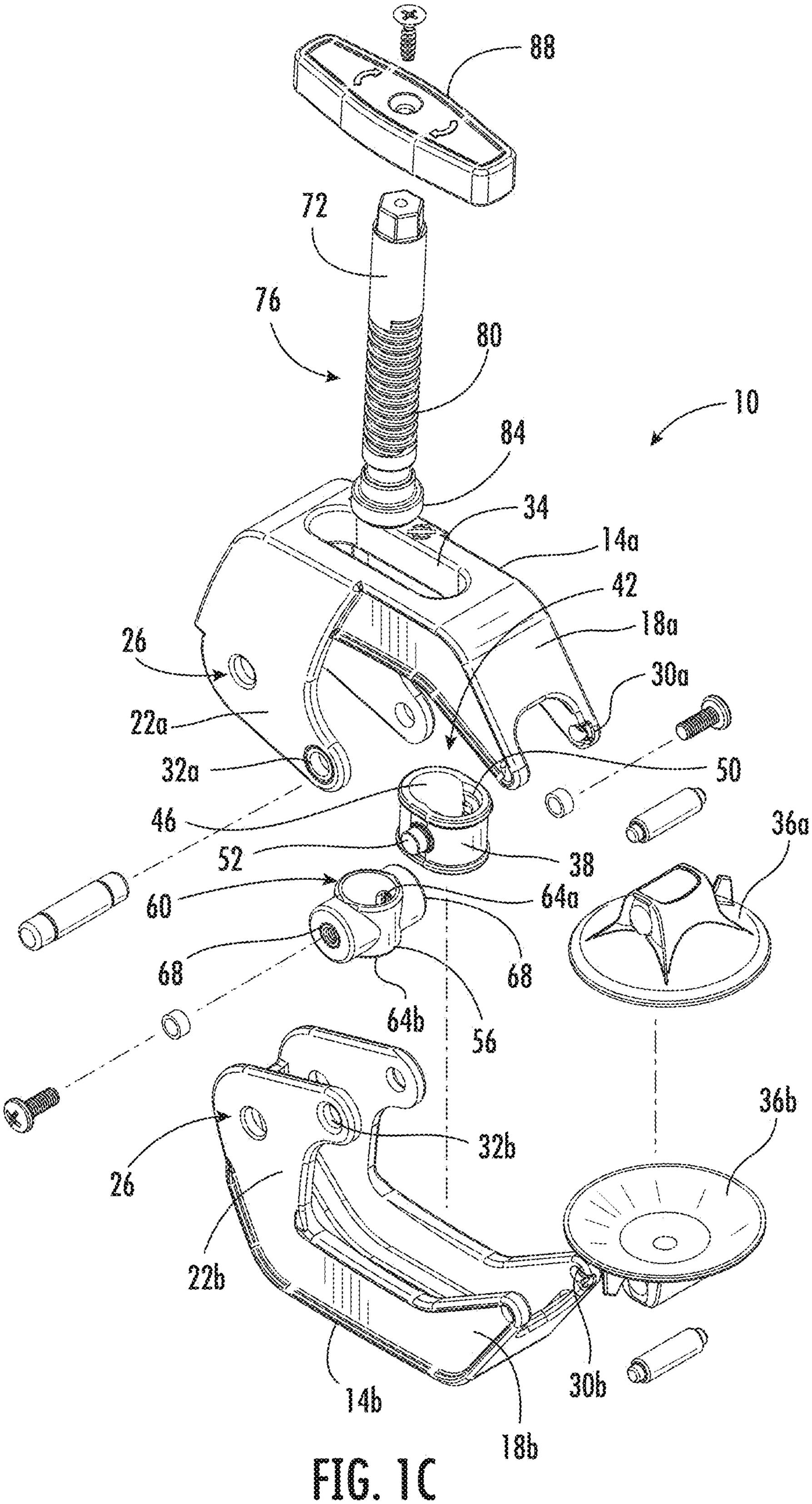
FIG. 1C is an exploded view of the tool of FIG. 1A.

As is discussed above, the arms 14 may be pivotally coupled to each other. The arms 14 may be pivotally coupled to each other in any manner. In the example illustrated in FIGS. 1A-3, the pivot axle 26 of the arms 14 is an opening that extends through each arm 14, and the arms 14 are pivotally coupled together by an arm pin that extends through the pivot axle 26 of each arm 14. An example of this is illustrated in FIG. 1C. In another example, the pivot axle 26 of the lower arm 14*b* may include arms (e.g., cylindrical arms) that extend outward from the lower arm 14*b*, and the pivot axle 26 of the upper arm 14*a* may be an opening, and the arms 14 are pivotally coupled together by positioning the arms of the lower arm 14*b* in the opening of the upper arm 14*a*.

In some examples, the first portions 18 of the arms 14 may each include one or more openings 30 (e.g., holes at the extremity of the first portions 18, as is illustrated as 30*a* and 30*b*) that allow an attachment point 36 to be pivotally coupled to each arm 14. In some examples, the second portion 22*a* of the upper arm 14*a* may include one or more openings 32*a* (e.g., holes at the extremity of the second portion 22*a*, as is illustrated) that allow the lead screw block 56 to be pivotally coupled to the second portion 22*a* of the upper arm 14*a*. In some examples, the second portion 22*b* of the lower arm 14*b* may include one or more openings 32*b* (e.g., holes at the extremity of the second portion 22*b*, as is illustrated) that allow the lead screw nut 38 to be pivotally coupled to the second portion 22*b* of the lower arm 14*b*.

In some examples, the upper arm 14*a* may include an opening 34 (e.g., an oval slot) that extends through the top-most surface of the upper arm 14*a*, as is illustrated in FIG. 1C. The opening 34 may allow the lead screw 72 to extend through the top-most surface of the upper arm 14, as is illustrated. The opening 34 may be sized to provide space for the lead screw 72 to be pivoted (e.g., back and forth) withing the opening 34 so as to switch the tool 14 from the engaged configuration to the disengaged configuration, and vice versa.

In some examples, the lower arm 14*b* may include a flat bottom surface that allows the tool 10 to be positioned on a surface (e.g., on a table). The flat bottom surface of the lower arm 14*b* may be shaped and/or sized to allow the tool 10 to remain upright on the surface (hands-free) even when the tool 14 is holding a device (e.g., a mobile phone). In some examples, one or more legs (e.g., 4 legs) may extend outward from the flat bottom surface of the lower arm 14*b* (as is illustrated in FIGS. 1A-1B), so as to assist in positioning the tool 10 on the surface.

The arms 14 may be made of any material, such as plastic, metal, a polymer, any other material, or any combination of the preceding. In the illustrated example, the arms 14 are made of glass-filled nylon. In some examples, the arms 14 may be 3D printed using a 3D printer, or may be made using any other manufacturing method (e.g., injection molded, machined).

In the example illustrated in FIGS. 1A-3, the tool 10 includes an attachment point 36 pivotally coupled to each arm 14. An attachment point 36 may refer to a structure that can removably couple to another device (e.g., a mobile phone). Examples of an attachment point 36 include a suction cup (e.g., for attaching to a smooth device), a hook, a wedge, a tooth, any other structure that can removably couple to another device, or any combination of the preceding. In the illustrated example, the attachment points 36 (e.g., 36*a* and 36*b*) are each suction cups; however, the specific type of attachment point 36 is variable/optional. In some examples, the tool 10 may include any other attachment point 36 that may be used for spreading gaps or lifting or pushing components.

In some examples, the tool 10 may include different types of attachment points 36. For example, attachment point 36*a* may be a suction cup, and attachment point 36*b* may be a wedge (or any other type of attachment point, other than a suction cup).

As is discussed above, the attachment points 36 may be pivotally coupled to the arms 14. The attachment points 36 may be pivotally coupled to the arms 14 in any manner. In the example illustrated in FIGS. 1A-3, the attachment points 36 (e.g., suction cups) each include attachment arms that may be positioned in the openings 30 of the arms 14.

Although the tool 10 is illustrated as including attachment points 36 that may be added to the arms 14, in some examples, the tool 10 may not include any separate attachment points 36. Instead, the attachment points 36 may be integrated with (or otherwise formed with) the arms 14. As an example of this, the first portions 18 of the arms 14 may be formed into the shape of wedge (or another type of attachment point). This may prevent the tool 10 from needing a separate attachment point 36.

In the example illustrated in FIGS. 1A-3, the tool 10 includes a lead screw nut 38 pivotally coupled to the second portion 22*b* of the lower arm 14*b*. The lead screw nut 38 may refer to any structure that may pivot in relation to the second portion 22*b* of the lower arm 14*b*, and that may further receive the lead screw 72, and that may have an engagement mechanism and a disengagement mechanism. These engagement and disengagement mechanisms may allow a user to switch the tool 10 from an engaged configuration to a disengaged configuration, or vice versa.

Figure 2A:
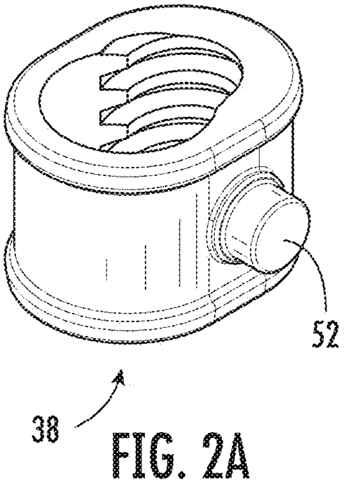
FIG. 2A is a perspective view of one example of a lead screw nut of the tool of FIG. 1A.
Figure 2B:
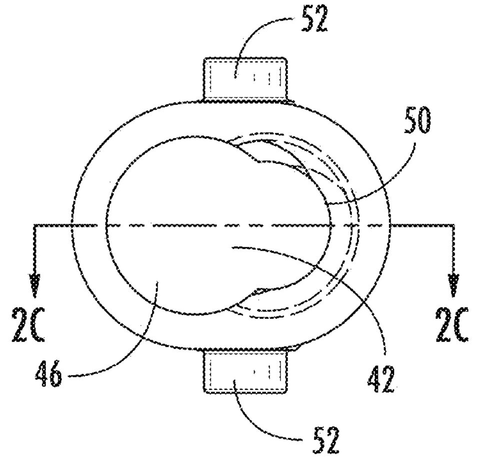
FIG. 2B is a top view of the lead screw nut of FIG. 2A.
Figure 2C:
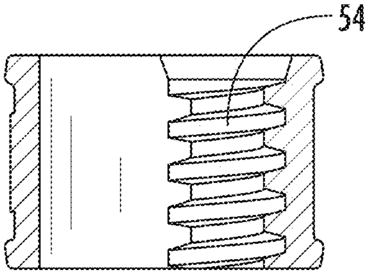
FIG. 2C is a cross-sectional view of the lead screw nut of FIG. 2B, along cline 2C-2C.

In the example illustrated in FIGS. 2A-2C, the lead screw nut 38 includes an opening 42 that extends through (e.g., entirely through) the lead screw nut 38 (e.g., through the height of the lead screw nut 38). Furthermore, in the illustrated example, the opening 42 includes a first opening portion 46 and a second opening portion 50. The first opening portion 46 may be an example of the disengagement mechanism of the lead screw nut 38, and the second opening portion 50 may be an example of the engagement mechanism of the lead screw nut 38.

The first opening portion 46 may be a hole (e.g., circular hole) that extends through the lead screw nut 38 and that has a diameter that is larger than a diameter (e.g., the major thread diameter) of a first screw portion 76 of the lead screw 72. Furthermore, the first opening portion 46 may not include any threads. In some examples, this may allow the lead screw 72 to move (e.g., up and down) along the height of the lead screw nut 38 unconstrained (e.g., with minimal or no resistance). In some examples, when the lead screw 72 is positioned within the first opening portion 46 (e.g., causing the lead screw 72 to extend through the first opening portion 46, as opposed to extending through the second opening portion 50), the tool 10 may be in a disengaged configuration. In this disengaged configuration, a user may be able to manually open and close the arms 14 without rotating the lead screw 72. That is, the user may be able to move the arms 14 of the tool 10 unconstrained, which may allow the user to easily apply the attachment points 36 (e.g., suction cups) to the device (e.g., mobile phone) that is being worked on, in some examples.

The second opening portion 50 may be a hole (e.g., circular hole) that extends through the lead screw nut 38 and that includes one or more threads 54. The threads 54 of the second opening portion 50 may be sized to engage with the threads 80 of the lead screw 72. In some examples, when the lead screw 72 is positioned within the second opening portion 50 (e.g., causing the lead screw 72 to extend through the second opening portion 50, as opposed to extending through the first opening portion 46), the tool 10 may be in an engaged configuration. In this engaged configuration, the lead screw 72 may only be able to move (e.g., up and down) along the height of the lead screw nut 38 when the lead screw 72 is rotated. In such an example, the user may no longer be able manually open and close the arms 14 without rotating the lead screw 72 (as was the case in the disengaged configuration). Instead, the user may rotate the lead screw 72 in a first direction (e.g., clockwise), causing the arms 14 to pivot open, and the user may rotate the lead screw 72 in a second direction (e.g., counter-clockwise), causing the arms 14 to pivot closed. By rotating the lead screw 72 while the tool 10 is in the engaged configuration, the user may be able to apply an exact amount of separating force (e.g., a constant but infinitely adjustable separating force) to the device (e.g., a mobile phone), in some examples. The separating force may then remain in place due to the self-locking nature of the lead screw 72 (even after the user removes their hands from the tool 10), in some examples. This may allow the user to remove their hands from the tool 10, and then use those hands to work on the components of the device (e.g., a mobile phone), in some examples.

As is discussed above, the threads 54 of the second opening portion 50 may be sized to engage with the threads 80 of the lead screw 72. The threads 54 of the second opening portion 50 may be sized in any manner that allows them to engage with the threads 80 of the lead screw 72. For example, the threads 54 may have pitch that matches the pitch of threads 80 of the lead screw 72. This matching pitch may refer to an identical pitch+/−10 percent. For example, if the pitch of the threads 80 of the lead screw 72 is 3 mm, the pitch of the threads 54 of the second opening portion 50 may be 3 mm+/−10 percent.

In the illustrated example, the threads 54 of the second opening portion 50 extend over only a portion of the circumference of the second opening portion 50, so as to allow the lead screw 72 to be removed from the second opening portion 50. For example, the threads 54 may extend over the circumference in an arc of 210 degrees+/−10 percent. In some examples, the threads 54 may extend over the circumference in an arc of 200 degrees-220 degrees.

The first opening portion 46 and the second opening portion 50 may be positioned in any manner in the lead screw nut 38 that allows a user to move the lead screw 72 back and forth between the first opening portion 46 and the second opening portion 50. In the example illustrated in FIGS. 2A-2C, the first opening portion 46 overlaps with the second opening portion 50. In other examples, the first opening portion 46 may not overlap with the second opening portion 50, but the two portions 46/50 may be connected by a channel (or other opening) that allows a user to move the lead screw 72 back and forth between the first opening portion 46 and the second opening portion 50.

As is discussed above, the lead screw nut 38 may be pivotally coupled to the second portion 22*b* of the lower arm 14*b*. The lead screw nut 38 may be pivotally coupled to the second portion 22 of the lower arm 14*b* in any manner. In the example illustrated in FIGS. 1A-3, the lead screw nut include two arms 52 (e.g., two opposing cylindrical shafts, an example of which is illustrated in FIG. 2B) that may be inserted into the openings 32*b* of second portion 22*b* the lower arm 14*b*, thereby allowing the lead screw nut 38 to pivot in relation to the second portion 22*b* the lower arm 14*b*.

The lead screw nut 38 may have any shape and/or size. In the illustrated example, the lead screw nut 38 is shaped as an elongated cylindrical (ovular) collar with the two arms 52 extending from the sides of the lead screw nut 38.

The lead screw nut 38 may be made of any material, such as plastic, metal, a polymer, any other material, or any combination of the preceding. In the illustrated example, the lead screw nut 38 is made of Polyoxymethylene (POM), also known as Acetal. In some examples, the lead screw nut 38 may be 3D printed using a 3D printer, or may be made using any other manufacturing method (e.g., injection molded, machined).

In the example illustrated in FIGS. 1A-3, the tool 10 includes a lead screw block 56 pivotally coupled to the second portion 22*a* of the upper arm 14*a*. The lead screw block 56 may refer to any structure that may pivot in relation to the second portion 22*a* of the upper arm 14*a*, and that may further receive the lead screw 72 and that may prevent the lead screw 72 from being removed from the lead screw block 56 when the tool 10 is assembled. In the illustrated example, the lead screw block 50 is a block, such as a bearing block.

In the illustrated example, the lead screw block 56 includes an opening 60 that extends through (e.g., entirely through) the lead screw block 56 (e.g., through the height of the lead screw block 56). Furthermore, in the illustrated example, the lead screw block includes a top side 64*a* and a bottom side 64*b*.

The opening 60 may be a hole (e.g., a circular hole) that extends through the lead screw block 56 and that has a diameter that is larger (e.g., slightly larger) than a diameter (e.g., the major thread diameter) of a first screw portion 76 of the lead screw 72. This may allow the lead screw 72 to be inserted entirely through the height of the lead screw block 56, in some examples. While the diameter of the opening 60 may be larger than a diameter (e.g., the major thread diameter) of the first screw portion 76 of the lead screw 72, the diameter of the opening 60 may also be smaller than a diameter of a second screw portion 84 of the lead screw 72, in some examples. This may prevent the lead screw 72 from being removed from the lead screw block 56 when the tool 10 is assembled. As is illustrated in FIG. 1A, and especially FIG. 3, the second screw portion 84 of the lead screw 72 may be in contact (e.g., pressed against) the bottom side 64*b* of the lead screw block 56. As such, when the lead screw 72 is moved upward (e.g., by rotating the lead screw 72) in relation to the lower arm 14*b*, the lead screw block 56 may also be moved upward in relation to the lower arm 14*a*. In some examples, this may cause the lead screw block 56 (and the second portion 22*a* of the upper arm 14*a*) to move closer to the lead screw nut 38 (and the second portion 22*b* of the lower arm 14*b*), which opens the arms 14. The opening 60 may be positioned in any manner through the lead screw block 56. In the illustrated example, the opening 60 is positioned to be transverse to the major axis of the lead screw block 56.

As is discussed above, the lead screw block 56 may be pivotally coupled to the second portion 22*a* of the upper arm 14*a*. The lead screw block 56 may be pivotally coupled to the second portion 22*a* of the upper arm 14*a* in any manner. In the example illustrated in FIGS. 1A-3, the lead screw block 56 may include opposed mounting openings 68, and the lead screw block 56 may be pivotally coupled to the second portion 22*a* of the upper arm 14*a* by one or more connectors that are inserted into the opposed mounting openings 68 of the lead screw block 56. The connector may be any connector that allows for a pivoting coupling such as a set of spacers and screws, as is illustrated in FIG. 1C.

The lead screw block 56 may have any shape and/or size. In the illustrated example, the lead screw block 56 is shaped as a cylindrical prism with opposed mounting openings 68 (e.g., holes) in the ends.

The lead screw block 56 may be made of any material, such as plastic, metal, a polymer, any other material, or any combination of the preceding. In the illustrated example, the lead screw block 56 is made of Polyoxymethylene (POM), also known as Acetal. In some examples, the lead screw block 56 may be 3D printed using a 3D printer, or may be made using any other manufacturing method (e.g., injection molded, machined).

Although the tool 10 is illustrated as including a lead screw block 56, in some examples, the tool 10 may not include a lead screw block 56. In such an example, the tool 10 may include any other manner in which the lead screw 72 may be pivotally and rotationally coupled to the second portion 22*a* of the upper arm 14*a*, thereby allowing the lead screw 72 to pivot in relation to the upper arm 14*a* and rotate in relation to the upper arm 14*a*. As one example of this, the tool 10 may include a ball and socket joint that pivotally and rotationally couples the lead screw 72 to the second portion 22 of the upper arm 14*a*. One example of such a ball and socket joint includes a socket that is coupled to (e.g., integrally formed with, or coupled in any other manner to) the second portion 22 of the upper arm 14*a*, and further includes a lead screw 72 that includes a ball-shaped second screw portion 84 of the lead screw 72. In this example, the ball-shaped second screw portion 84 of the lead screw 72 may fit into (and be held by) the socket of the second portion 22 of the upper arm 14*a*, thereby allowing the lead screw 72 to pivot in relation to the upper arm 14*a* and rotate in relation to the upper arm 14*a*. In other examples, the lead screw 72 may be pivotally and rotationally coupled to the second portion 22*a* of the upper arm 14*a* in any other manner.

In the example illustrated in FIGS. 1A-3, the tool 10 includes a lead screw 72. The lead screw 72 refers to any structure that may be utilized to open and close the arms 14, and that may further be utilized to switch the tool 14 from an engaged configuration to a disengaged configuration (or vice versa).

In the illustrated example, the lead screw 72 extends through the opening 34 of the upper arm 14*a*, through the opening 42 of the lead screw nut 38, and through the opening 60 of the lead screw block 56. In the illustrated example, the lead screw 72 includes a first screw portion 76 and a second screw portion 84.

Figure 3:
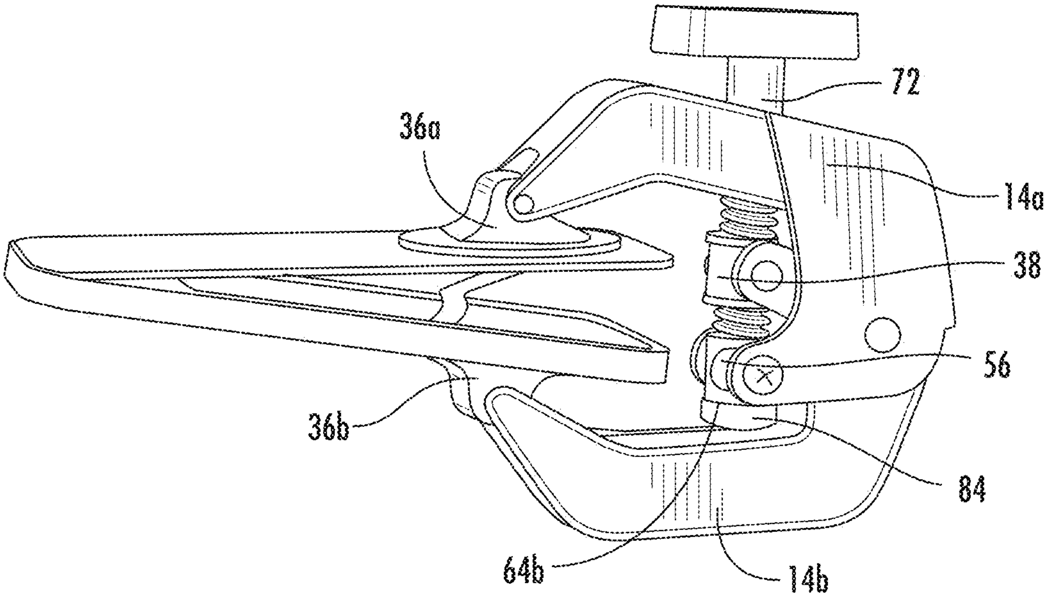
FIG. 3 is one example of the tool of FIG. 1A being used to apply a separating force to an example device.

In the illustrated example, the first screw portion 76 is positioned vertically above the second screw portion 84, and the first screw portion 76 includes one or more threads 80. The threads 80 of the lead screw 76 may be sized to engage with the threads 54 of the second opening portion 50 of the opening 42 of the lead screw nut 38. When the threads 80 of the lead screw 72 are engaged with the threads 54 of the second opening portion 50 of the opening 42 of the lead screw nut 38 (and the lead screw 72 extends through the second opening portion 50, as opposed to extending through the first opening portion 46), the tool 10 may be in an engaged configuration. In this engaged configuration, the engaged threads 80 and 54 may prevent the user from being able to manually open and close the arms 14 without rotating the lead screw 72 (as is the case when the tool 10 is in the disengaged configuration). Instead, the user may rotate the lead screw 72 in a first direction (e.g., clockwise), causing the arms 14 to pivot open, and the user may rotate the lead screw in a second direction (e.g., counter-clockwise), causing the arms 14 to pivot closed. By rotating the lead screw 72 in engaged configuration, the user may be able to apply an exact amount of separating force (e.g., a constant but infinitely adjustable separating force) to the device (e.g., a mobile phone), in some examples, as is illustrated in FIG. 3. The separating force may then remain in place due to the self-locking nature of the lead screw 72 (even after the user removes their hands from the tool 10), in some examples. This may allow the user to remove their hands from the tool 10, and then use those hands to work on the components of the device (e.g., a mobile phone), in some examples.

The threads 80 of the first screw portion 76 of the lead screw 72 may be sized to engage with the threads 54 of the second opening portion 50, and may further be sized to provide a self-locking nature of the lead screw 72, in some examples. As an example of this, threads 80 may have a pitch of 3 mm+/−10 percent. Such a pitch may provide a sufficient separating force, while still being shallow enough for self-locking (i.e., the lead screw 72 remains at the same position it was last turned to, and the arms 14 remain at the same distance from each other, providing a constant separating force, even if the user removes their hands 10 from the tool 10).

In the illustrated example, the first screw portion 76 of the lead screw 72 may have a diameter (e.g., the major thread diameter of the threads 80) that allows the threads 80 to engage with the threads 54 of the second opening portion 50. This diameter of the first screw portion 76 may also be smaller than both the opening 60 of the lead screw block 56 (allowing the lead screw 72 to extend through the lead screw block 56) and the first opening portion 46 of the lead screw nut 38 (allowing the lead screw 72 to move along the height of the lead screw nut 38 unconstrained). In some examples, the diameter of the first screw portion 76 of the lead screw 72 (e.g., the major thread diameter of the threads 80) is 12 mm+/−10 percent.

In the illustrated example, the second screw portion 84 is positioned vertically lower than the first screw portion 76, and has a diameter that is larger than the diameter of the first screw portion 76 of the lead screw 72 (e.g., the major thread diameter of the threads 80). This diameter of the second screw portion 84 may also be larger than the diameter of the opening 60 of the lead screw block 56. This may prevent the lead screw 72 from being removed from the lead screw block 56 when the tool 10 is assembled. As is illustrated in FIG. 1A, and especially FIG. 3, the second screw portion 84 of the lead screw 72 may be in contact (e.g., pressed against) the bottom side 64*b* of the lead screw block 56. As such, when the lead screw 72 is moved upward (e.g., by rotating the lead screw 72) in relation to the lower arm 14*b*, the lead screw block 56 may also be moved upward in relation to the lower arm 14*a*. In some examples, this may cause the lead screw block 56 (and the second portion 22*a* of the upper arm 14*a*) to move closer to the lead screw nut 38 (and the second portion 22*b* of the lower arm 14*b*), which opens the arms 14.

In the example illustrated in FIGS. 1A-3, the second screw portion 84 is a cylindrical collar bump. As is illustrated, this cylindrical collar may increase the diameter of the unthreaded portion of the lead screw 72 in that local area.

The lead screw 72 may have any shape and/or size. In the illustrated example, the lead screw 72 has a length of 90 mm+/−10 percent. The lead screw 72 may be made of any material, such as plastic, metal, a polymer, any other material, or any combination of the preceding. In the illustrated example, the lead screw 72 is made of Polyoxymethylene (POM), also known as Acetal. In some examples, the lead screw 72 may be 3D printed using a 3D printer, or may be made using any other manufacturing method (e.g., injection molded, machined).

In some examples, the lead screw 72 may include a handle 88, such as the handle 88 illustrated in FIGS. 1A-3. The handle 88 may assist the user in manipulating the lead screw 72. For example, the handle 88 may make it easier for the user to rotate the lead screw 72 (so as to open and close the arms 14) and/or to switch the lead screw 72 from the engaged configuration to the disengaged configuration (or vice versa). That is, the handle 88 may provide a mechanical advantage to the user for manipulating the lead screw 72.

The handle 88 may have any shape and/or size. For example, the handle 88 may be a T-shaped handle (e.g., two arms), a X-shaped handle (e.g., 4 arms), a Y-shaped handle (e.g., 3 arms), an asterisk-shaped handle (e.g., 5 or 6 arms), a knob, any other shape, or any combination of the preceding. In the illustrated example, the handle 88 is a T-shaped handle.

The handle 88 may be removably coupled to the lead screw 72, thereby allowing the handle 88 to be added and/or removed from the lead screw 72 (e.g., for assembly and disassembly of the tool 10). The handle 88 may be removably coupled to the lead screw 72 in any manner. In the illustrated example, the handle 88 is removable coupled to the lead screw 72 by a connector (e.g., a screw).

The handle 88 may be made of any material, such as plastic, metal, a polymer, any other material, or any combination of the preceding. In the illustrated example, the handle 88 is made of Polyoxymethylene (POM), also known as Acetal. In some examples, the handle 88 may be 3D printed using a 3D printer, or may be made using any other manufacturing method (e.g., injection molded, machined).

Although the tool 10 is illustrated as including a handle 88, in some examples, the tool 10 may not include a handle 88. In such an example, the user may manipulate the lead screw 72 without a handle 88. In other examples, the user may utilize a wrench or other tool to manipulate the lead screw 72 without a handle 88. In such examples, the lead screw 72 may include one or more attachment areas that may be used to attach the wrench (or other tool) to the lead screw 72.

As is discussed above, the tool 10 includes both a disengaged configuration and an engaged configuration. In the disengaged configuration, a user may be able to manually open and close the arms 14 without rotating the lead screw 72. That is, the user may be able to move the arms 14 of the tool 10 unconstrained, which may allow the user to easily apply the attachment points 36 (e.g., suction cups) to the device (e.g., mobile phone) that is being worked on, in some examples. In the engaged configuration, the user may no longer be able manually open and close the arms 14 without rotating the lead screw 72. Instead, the user may rotate the lead screw 72 in a first direction (e.g., clockwise), causing the arms 14 to pivot open, and the user may rotate the lead screw in a second direction (e.g., counter-clockwise), causing the arms 14 to pivot closed. As is illustrated in FIG. 3, this may allow the user to apply an exact amount of separating force (e.g., a constant but infinitely adjustable separating force) to the device (e.g., a mobile phone), in some examples.

In the example illustrated in FIGS. 1A-3, a user may switch the tool from the disengaged configuration to the engaged configuration (and vice versa). The user may switch the tool 10 from the disengaged configuration to the engaged configuration (and vice versa) in any manner.

In the illustrated example, the user may switch the tool 10 from the disengaged configuration to the engaged configuration (and vice versa) by manually shifting the position of the lead screw 72 in relation to the arms 14. For example, in order to switch the tool 10 from the disengaged configuration to the engaged configuration, the user may manually push on the lead screw 72 (and the handle 88) to shift the position of the lead screw 72 forward (e.g., towards the attachment points 36) in relation to the arms 14 to an engaged position (illustrated as reference line 90 in FIG. 1A, which illustrates the tool 10 in the engaged configuration). This shift may pivot the lead screw 72 forward in relation to the arms 14, causing both the lead screw nut 38 and the lead screw block 56 to also pivot forward in relation to the arms 14, and further causing the lead screw 72 to move from the first opening portion 46 to the second opening portion 50 of the opening 42 of the lead screw nut 38, and further causing the threads 80 of the lead screw 72 to engage with the threads 54 of the second opening portion 50 of the lead screw nut 38. In this engaged configuration, the user may be able to move (e.g., pivot) the first portions 18 of the arms 14 (and the attachment points 36, if any) closer to each other (thereby causing the arms 14 to close) by rotating the lead screw 72 in a first direction (e.g., counterclockwise). Also, in this engaged configuration, the user may be able to move (e.g., pivot) the first portions 18 of the arms 14 (and the attachment points 36, if any) further from each other (thereby causing the arms 14 to open) by rotating the lead screw in a second direction (e.g., clockwise).

As another example, in order to switch the tool 10 from the engaged configuration to the disengaged configuration, the user may manually pull on the lead screw 72 (and the handle 88) to shift the position of the lead screw 72 backwards (e.g., away from the attachment points 36) in relation to the arms 14 to a disengaged position (illustrated as reference line 94 in FIG. 1A, which illustrates the tool 10 in the engaged configuration, not the disengaged configuration). This shift may pivot the lead screw 72 backwards in relation to the arms 14, causing both the lead screw nut 38 and the lead screw block 56 to also pivot backwards in relation to the arms 14, and further causing the threads 80 of the lead screw 72 to disengage from the threads 54 of the second opening portion 50 of the opening 42 of the lead screw nut 38, and further causing the lead screw 72 to move from the second opening portion 50 to the first opening portion 46 of the opening 42 of the lead screw nut 38 (so as to cause the lead screw 72 to extend through the first opening portion 46 of the opening 42 of the lead screw nut 38, as opposed to through the second opening portion 50). In this disengaged configuration, the user may be able to move (e.g., pivot) the first portions 18 of the arms 14 (and the attachment points 36, if any) closer to each other (thereby causing the arms 14 to close) without rotating the lead screw 72 at all. Instead, the user may just manually push the arms 14 together. Also, in this disengaged configuration, the user may be able to move (e.g., pivot) the first portions 18 of the arms 14 (and the attachment points 36, if any) further from each other (thereby causing the arms 14 to open) without rotating the lead screw 72 at all. Instead, the user may just manually pull the arms 14 apart.

As is seen above, in the example illustrated in FIGS. 1A-3, the user may switch the tool 10 from the disengaged configuration to the engaged configuration (and vice versa) by manually shifting the position of the lead screw 72 in relation to the arms 14, such as by pushing or pulling on the lead screw 72. In such an example, the tool 14 may be switched from the disengaged configuration to the engaged configuration (and vice versa) without the use of any buttons or springs. In fact, in some examples, the tool 10 may not include any buttons or springs. This may make the tool 10 easier to use, and may further allow the tool 10 to last longer (as there are less delicate parts that can break), in some examples.

In one example of the operation of the tool 10, a user may desire to open a consumer device (e.g., a mobile phone) to view and/or fix one or more internal components of the device. To do so, the user may switch the tool 10 to the disengaged configuration by moving the lead screw 72 to the disengaged position 94. As one example of this, the user may pull the lead screw 72 (e.g., via the handle 88) toward the rear of the tool 10 (e.g., away from the first portions 18 of the arms 14) and also toward the rear of the lead screw nut 38. This may separate the threads 80 of the lead screw 72 from the threads 54 of the lead screw nut 38. Now in the disengaged configuration, the upper arm 14*a* and lower arm 14*b* may be freely rotated around their shared pivot point (e.g., pivot axle 26), and the arms 14 may be opened and closed unconstrained. The attachment points 36 (e.g., suction cups) may then be applied to the two opposing panels of a device to be opened. Following attachment of the attachment points 36 to the device, the user may switch the tool 10 to the engaged configuration by moving the lead screw 72 to the engaged position 90. As one example of this, the user may push the lead screw 72 (e.g., via the handle 88) toward the front of the tool 10 (e.g., towards the first portion 18 of the arms 14) and also toward the front of the lead screw nut 38. This may engage the threads 80 of the lead screw 72 with the threads 54 of the lead screw nut 38.

In the engaged configuration, the user may rotate the lead screw 72 (e.g., via the handle 88) in a first direction (e.g., clockwise), causing the lead screw nut 38 and lead screw block 56 to pull toward each other. This may pull the second portions 22 of the arms 14 together, which may spread the first portions 18 of the arms 14 away from each other, and which may further spread the attachment points 36 away from each other. As the attachment points 36 spread away from each other, the panels of the consumer device may be opened. Using the infinitely adjustable constant separating force provided by the tool 10 (via rotation of the lead screw 72), the user may decide when the panels of the consumer device are opened sufficiently wide. Once the panels of the consumer device are opened sufficiently wide, the user may stop rotating the lead screw 72. The user can then view and/or fix one or more internal components of the consumer device, while the tool 10 continues to separate the panels with the constant separating force (hands free). An example of this hands free, constant separating force is illustrated in FIG. 3. Alternatively, once the panels of the consumer device are opened sufficiently wide, the user may disengage the attachment points 36 from the panels and remove the tool 10 from the consumer device.

In one example of the assembly of the tool 10, a user (e.g., a manufacturer) may (1) insert the lead screw 72 into both the lead screw block 56 and the lead screw nut 38; (2) snap the arms 52 on the sides of the lead screw nut 38 into the openings 32*b* in the second portion 22*b* of the lower arm 14*b*, with the second opening portion 50 of the opening 42 of the lead screw nut 38 facing the front of the tool 10; (3) fit the second portion 22*a* of the upper arm 14*a* over the second portion 22*b* of the lower arm 14*b*; (4) insert a pivot pin into the pivot axle 26 to join the arms 14 together; (5) secure the lead screw block 56 to the second portion 22*a* of the upper arm 14*a* via one or more screws and spacers inserted into the openings 32*a* of the second portion 22*a* of the upper arm 14*a* (causing the screws to be inserted into the opposed mounting openings 68 of the lead screw block 56); (6) optionally attach one or more attachment points 36 to the first portions 18 of the arms 14; and (7) optionally install a handle 88 onto the lead screw 72 (via a screw).

Modifications, additions, combinations, or omissions may be made to the tool 10 of FIGS. 1A-3 without departing from the scope of the disclosure. For example, the tool 10 may not include one or more components described above, such as the handle 88, the individual attachment points 36, and/or one or more other components described above. In other examples, one or more of the components described above may be integrated into one or more of the other components described above.

As another example, although the tool 10 has been described and illustrated as switching from the disengaged configuration to the engaged configuration by a user manually pushing on the lead screw 72 to pivot it forward, and switching from the engaged configuration to the disengaged configuration by a user manually pulling on the lead screw 72 to pivot it backwards, in some examples, this may be reversed. In such examples, switching from the disengaged configuration to the engaged configuration may be performed by a user manually pulling on the lead screw 72 to pivot it backwards, and switching from the engaged configuration to the disengaged configuration may be performed by a user manually pushing on the lead screw 72 to pivot it forwards. In other examples, the lead screw 72 may be moved in any other direction to switch from the engaged configuration to the disengaged configuration or from the disengaged configuration to the engaged configuration.

As a further example, although tool 10 has been described and illustrated as having the second portions 22 of the arms 14, the lead screw nut 38, and the lead screw block 56 all located in a position that is forward of the pivot axle 26, in some examples, the second portions 22 of the arms 14, the lead screw nut 38, and the lead screw block 56 may all be located in a position that is on the other side (e.g., rearward) of the pivot axle 26. In such an example, the direction of the applied force may be opposite of that previously described above; however, the configuration would provide the same functionality as that described above.

As another example, although the tool 10 has been described as being used to provide a separating force to a consumer device (e.g., a mobile phone), in some examples, the tool 10 may be used anywhere that fine-control spreading force may be needed to be applied. Furthermore, the consumer device is not limited to a mobile phone. Other examples of a consumer device include tablets, laptop or desktop computer screens, portable music players, digital photo frames, any other consumer device, or any combination of the preceding.

As a further example, although the tool 10 has been described as being used to provide a separating force to a consumer device (e.g., a mobile phone), in some examples, the tool 10 may alternatively (or additionally) be used to provide a compression force to a consumer device (e.g., a mobile phone). For example, after glue or adhesive is applied to panels of the consumer device, the tool 10 may be used to compress the two panels together (e.g., by closing the arms 14 of the tool 10). This may apply a constant, infinitely adjustable, compression force, hands-free.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification.

What is claimed is:

1. A tool, comprising:

a first arm comprising a first portion, a second portion, and an opening;

a second arm pivotally coupled to the first arm, the second arm comprising a first portion and a second portion;

a first attachment point pivotally coupled to the first portion of the first arm;

a second attachment point pivotally coupled to the first portion of the second arm;

a lead screw nut pivotally coupled to the second portion of the second arm, the lead screw nut comprising an opening that extends through the lead screw nut, wherein the opening comprises a first opening portion and a second opening portion, wherein the second opening portion comprises a plurality of threads;

a lead screw block pivotally coupled to the second portion of the first arm, the lead screw block comprising an opening that extends through the lead screw block;

a lead screw extending through the opening of the first arm, through the opening of the lead screw nut, and through the opening of the lead screw block, the lead screw comprising a first screw portion that comprises a plurality of threads, the first screw portion having a first diameter that is less than a diameter of the opening of the lead screw block and that is also less than a diameter of the first opening portion of the opening of the lead screw nut, the lead screw further comprising a second screw portion that is positioned against a side of the lead screw block and that has a second diameter that is greater than the diameter of the opening of the lead screw block; and a handle coupled to the lead screw;

wherein the tool comprises an engaged configuration and a disengaged configuration;

wherein the lead screw is pivotable, in relation to the first and second arms, by a user to switch the tool from the engaged configuration to the disengaged configuration and from the disengaged configuration to the engaged configuration;

wherein, in the engaged configuration, the lead screw extends through the opening of the lead screw nut in a position that causes the lead screw to extend through the second opening portion of the opening of the lead screw nut and further causes the plurality of threads of the lead screw to engage with the plurality of the threads of the second opening portion of the opening of the lead screw nut, wherein, in the engaged configuration, the tool is configured to cause the first portion of the first arm to pivot closer to the first portion of the second arm when the lead screw is rotated in a first direction, wherein, in the engaged configuration, the tool is further configured to cause the first portion of the first arm to pivot further from the first portion of the second arm when the lead screw is rotated in a second direction;

wherein, in the disengaged configuration, the lead screw extends through the opening of the lead screw nut in a position that causes the lead screw to extend through the first opening portion of the opening of the lead screw nut, wherein, in the disengaged configuration, the tool is configured to allow the first portion of the first arm to be pivoted closer to the first portion of the second arm without the lead screw being rotated, wherein, in the disengaged configuration, the tool is further configured to allow the first portion of the first arm to be pivoted further from the first portion of the second arm without the lead screw being rotated.

2. The tool of claim 1, wherein the first attachment point comprises a first suction cup and the second attachment point comprises a second suction cup.

3. The tool of claim 1, wherein the tool is configured to be switched from the engaged configuration to the disengaged configuration and from the disengaged configuration to the engaged configuration without the use of any springs.

4. The tool of claim 1, wherein the tool is configured to be switched from the engaged configuration to the disengaged configuration and from the disengaged configuration to the engaged configuration without the use of any buttons.

5. A tool, comprising:

a first arm comprising a first portion and a second portion;

a second arm pivotally coupled to the first arm, the second arm comprising a first portion and a second portion;

a lead screw nut pivotally coupled to the second portion of the second arm, the lead screw nut comprising an opening that extends through the lead screw nut, wherein the opening comprises a first opening portion and a second opening portion, wherein the second opening portion comprises a plurality of threads; and a lead screw extending through the opening of the lead screw nut, the lead screw comprising a first screw portion that comprises a plurality of threads, the first screw portion having a first diameter that is less than a diameter of the first opening portion of the opening of the lead screw nut, wherein the lead screw is pivotally and rotationally coupled to the second portion of the first arm;

wherein the tool comprises an engaged configuration and a disengaged configuration;

wherein, in the engaged configuration, the lead screw extends through the opening of the lead screw nut in a position that causes the lead screw to extend through the second opening portion of the opening of the lead screw nut and further causes the plurality of threads of the lead screw to engage with the plurality of the threads of the second opening portion of the opening of the lead screw nut, wherein, in the engaged configuration, the tool is configured to cause the first portion of the first arm to pivot closer to the first portion of the second arm when the lead screw is rotated in a first direction, wherein, in the engaged configuration, the tool is further configured to cause the first portion of the first arm to pivot further from the first portion of the second arm when the lead screw is rotated in a second direction;

wherein, in the disengaged configuration, the lead screw extends through the opening of the lead screw nut in a position that causes the lead screw to extend through the first opening portion of the opening of the lead screw nut, wherein, in the disengaged configuration, the tool is configured to allow the first portion of the first arm to be pivoted closer to the first portion of the second arm without the lead screw being rotated, wherein, in the disengaged configuration, the tool is further configured to allow the first portion of the first arm to be pivoted further from the first portion of the second arm without the lead screw being rotated.

6. The tool of claim 5, wherein the lead screw is pivotable, in relation to the first and second arms, by a user to switch the tool from the engaged configuration to the disengaged configuration and from the disengaged configuration to the engaged configuration.

7. The tool of claim 5, further comprising:

a first attachment point pivotally coupled to the first portion of the first arm; and a second attachment point pivotally coupled to the first portion of the second arm.

8. The tool of claim 7, wherein the first attachment point comprises a first suction cup and the second attachment point comprises a second suction cup.

9. The tool of claim 5, wherein the tool is configured to be switched from the engaged configuration to the disengaged configuration and from the disengaged configuration to the engaged configuration without the use of any springs.

10. The tool of claim 5, wherein the tool is configured to be switched from the engaged configuration to the disengaged configuration and from the disengaged configuration to the engaged configuration without the use of any buttons.

11. The tool of claim 5, wherein each of the lead screw nut and the lead screw are located in a position that is forward of a pivot axle of the first and second arms.

12. The tool of claim 5, further comprising a handle coupled to the lead screw.

13. The tool of claim 5, wherein the second portion of the second arm is positioned within the second portion of the first arm, and wherein the second arm is pivotally coupled to the first arm at a pivot axle.

14. The tool of claim 5, wherein the first opening portion of the opening of the lead screw nut overlaps with the second opening portion of the opening of the lead screw nut.

15. The tool of claim 5, wherein the first opening portion of the opening of the lead screw nut is devoid of any threads.

16. The tool of claim 5, wherein the plurality of threads of the second opening portion of the opening of the lead screw nut extend over a circumference of the second opening portion of the opening of the lead screw nut in an arc of 200 degrees-220 degrees.

17. The tool of claim 5, wherein the second arm comprises a flat bottom surface.

18. The tool of claim 5, further comprising a lead screw block pivotally coupled to the second portion of the first arm, the lead screw block comprising an opening that extends through the lead screw block, wherein the lead screw extends through the opening of the lead screw block, wherein the lead screw further comprises a second screw portion that has a second diameter that is greater than the diameter of the opening of the lead screw block.

19. A method of assembling a tool, comprising:

pivotally coupling a first arm to a second arm, the first arm comprising a first portion and a second portion, the second arm comprising a first portion and a second portion;

pivotally coupling a lead screw nut to the second portion of the second arm, the lead screw nut comprising an opening that extends through the lead screw nut, wherein the opening comprises a first opening portion and a second opening portion, wherein the second opening portion comprises a plurality of threads;

positioning a lead screw through the opening of the lead screw nut, the lead screw comprising a first screw portion that comprises a plurality of threads, the first screw portion having a first diameter that is less than a diameter of the first opening portion of the opening of the lead screw nut; and pivotally and rotationally coupling the lead screw to the second portion of the first arm.

20. The method of claim 19, wherein the tool comprises an engaged configuration and a disengaged configuration;

wherein, in the engaged configuration, the lead screw extends through the opening of the lead screw nut in a position that causes the lead screw to extend through the second opening portion of the opening of the lead screw nut and further causes the plurality of threads of the lead screw to engage with the plurality of the threads of the second opening portion of the opening of the lead screw nut, wherein, in the engaged configuration, the tool is configured to cause the first portion of the first arm to pivot closer to the first portion of the second arm when the lead screw is rotated in a first direction, wherein, in the engaged configuration, the tool is further configured to cause the first portion of the first arm to pivot further from the first portion of the second arm when the lead screw is rotated in a second direction;

wherein, in the disengaged configuration, the lead screw extends through the opening of the lead screw nut in a position that causes the lead screw to extend through the first opening portion of the opening of the lead screw nut, wherein, in the disengaged configuration, the tool is configured to allow the first portion of the first arm to be pivoted closer to the first portion of the second arm without the lead screw being rotated, wherein, in the disengaged configuration, the tool is further configured to allow the first portion of the first arm to be pivoted further from the first portion of the second arm without the lead screw being rotated.

* * * * *